(12) United States Patent
Ishimoto et al.

(10) Patent No.: US 11,192,594 B2
(45) Date of Patent: Dec. 7, 2021

(54) REAR VEHICLE-BODY STRUCTURE OF VEHICLE

(71) Applicant: MAZDA MOTOR CORPORATION, Hiroshima (JP)

(72) Inventors: Kazunori Ishimoto, Aki-gun (JP); Hideaki Hoshuyama, Hiroshima (JP); Yukitaka Takeshita, Kure (JP); Kenichi Sato, Kure (JP); Itsuki Gunji, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 30 days.

(21) Appl. No.: 16/733,824

(22) Filed: Jan. 3, 2020

(65) Prior Publication Data
US 2020/0269928 A1 Aug. 27, 2020

(30) Foreign Application Priority Data

Feb. 27, 2019 (JP) .............................. JP2019-033445

(51) Int. Cl.
*B62D 25/08* (2006.01)
*B60R 22/34* (2006.01)
(Continued)

(52) U.S. Cl.
CPC ............ *B62D 25/087* (2013.01); *B60R 22/34* (2013.01); *B62D 21/11* (2013.01); *B62D 25/025* (2013.01);
(Continued)

(58) Field of Classification Search
CPC .... B62D 25/08; B62D 25/088; B62D 25/087; B62D 25/06; B62D 25/02; B62D 27/02; B62D 23/00; B62D 23/005
(Continued)

(56) References Cited

U.S. PATENT DOCUMENTS

| 6,619,729 B2 * | 9/2003 | Kimura | .................. B60J 5/0477 |
| | | | 296/203.01 |
| 2007/0138837 A1 * | 6/2007 | Tomioka | ................ B62D 25/08 |
| | | | 296/203.04 |

(Continued)

FOREIGN PATENT DOCUMENTS

JP 2016-107789 A 6/2016

*Primary Examiner* — Dennis H Redder
*Assistant Examiner* — Joyce Eileen Hill
(74) *Attorney, Agent, or Firm* — Studebaker & Brackett PC

(57) ABSTRACT

There are provided first and second loop-shaped structure sections which are respectively provided to extend continuously along a lower wall part, right-and-left both side wall parts, and an upper wall part of a vehicle body so as to have a loop shape in a vehicle elevational view. The first loop-shaped structure section is positioned in front of a damper support section. A lower-side part of the second loop-shaped structure section which is located at a lower level than the damper support section is formed by a part of the first loop-shaped structure section and its upper-side part is positioned in back of the damper support section. Each of these loop-shaped structure sections is formed by a closed-cross section portion where a closed-cross section is partitioned by plural members and/or a thick plate portion having a thicker plate thickness than a vehicle-body panel.

10 Claims, 11 Drawing Sheets

(51) Int. Cl.
*B62D 21/11* (2006.01)
*B62D 25/02* (2006.01)
*B62D 25/04* (2006.01)
*B62D 25/06* (2006.01)
*B62D 25/16* (2006.01)
*B62D 25/20* (2006.01)
*B62D 27/02* (2006.01)
*B62D 23/00* (2006.01)

(52) U.S. Cl.
CPC ............. *B62D 25/04* (2013.01); *B62D 25/06* (2013.01); *B62D 25/16* (2013.01); *B62D 25/20* (2013.01); *B62D 23/00* (2013.01); *B62D 23/005* (2013.01); *B62D 25/08* (2013.01); *B62D 25/088* (2013.01); *B62D 27/02* (2013.01)

(58) Field of Classification Search
USPC .... 296/193.01, 193.02, 193.06, 193.08, 198, 296/203.01, 203.04
See application file for complete search history.

(56) References Cited

U.S. PATENT DOCUMENTS

| | | | |
|---|---|---|---|
| 2007/0215402 A1* | 9/2007 | Sasaki | B62D 25/088 180/232 |
| 2011/0156447 A1* | 6/2011 | Matsuoka | B62D 25/088 296/203.04 |
| 2012/0205944 A1* | 8/2012 | Kido | B62D 25/088 296/187.09 |
| 2013/0221708 A1* | 8/2013 | Hanakawa | B62D 25/088 296/193.09 |
| 2013/0241240 A1* | 9/2013 | Tokumoto | B62D 25/087 296/193.08 |
| 2015/0251708 A1* | 9/2015 | Kim | B62D 23/005 296/203.01 |
| 2016/0185394 A1* | 6/2016 | Sasaki | B62D 29/008 296/191 |
| 2017/0197664 A1* | 7/2017 | Yoshida | B62D 25/04 |
| 2018/0170434 A1* | 6/2018 | Saito | B62D 25/088 |

* cited by examiner

REAR VEHICLE-BODY STRUCTURE OF VEHICLE

BACKGROUND OF THE INVENTION

The present invention relates to a rear vehicle-body structure of a vehicle in which a loop-shaped structure section which is configured to have a loop shape in a vehicle elevational view is provided at a vehicle-body rear portion, wherein the loop-shaped structure section is formed by a closed-cross section portion and/or a thick plate portion having a thicker plate thickness than a vehicle-body panel.

Japanese Patent Laid-Open Publication No. 2016-107789 discloses a structure which exemplifies the above-described rear vehicle-body structure of the vehicle. That is, this disclosed structure is configured such that a damper support section for a rear suspension is provided at an upper part of a rear wheel house, a closed-cross section portion is formed by a floor panel and a floor cross member at a lower wall part of a vehicle body which extends in a vehicle width direction, a closed-cross section portion is formed by three members of a rear pillar inner, an inside rear pillar reinforcement, and an outside rear pillar reinforcement at each of right-and-left both side wall parts of the vehicle body which extends in a vertical direction, a closed-cross section portion is formed by a roof panel and a roof reinforcement at an upper wall part of the vehicle body which extends in the vehicle width direction, and the above-described closed-cross section portions are connected in a loop shape in the vehicle elevational view such that a loop-shaped structure section is provided at a vehicle-body rear portion, wherein the above-described inside rear pillar reinforcement interconnects the floor cross member arranged on a forward side, in a vehicle longitudinal direction, of the above-described damper support section of the rear pillar inner and the above-described outside rear pillar reinforcement arranged along a rear portion of a rear-door opening edge.

However, the above-described conventional structure disclosed in the patent document, in which the loop-shaped structure section having the loop shape in the vehicle elevational view is provided at the vehicle-body rear portion, may not be able to efficiently improve the rigidity of the vehicle-body rear portion because the inside rear pillar reinforcement is spaced forwardly, in the vehicle longitudinal direction, apart from the damper support section for the rear suspension. Therefore, there is room for improvement in improving the rigidity of the vehicle-body rear portion.

SUMMARY OF THE INVENTION

Accordingly, an object of the present invention is to provide a rear vehicle-body structure of a vehicle which can securely improve the vehicle-body rigidity of the vehicle-body rear portion.

The rear vehicle-body structure of the vehicle according to the present invention comprises a damper support section for a rear suspension provided at an upper part of a rear wheel house, a first loop-shaped structure section provided to extend continuously along a lower wall part, right-and-left both side wall parts, and an upper wall part of a vehicle body so as to have a loop shape in a vehicle elevational view, the first loop-shaped structure section being positioned on a forward side, in a vehicle longitudinal direction, of the damper support section, and a second loop-shaped structure section provided to extend continuously along a lower wall part, right-and-left both side wall parts, and an upper wall part of the vehicle body so as to have a loop shape in the vehicle elevational view, the second loop-shaped structure section comprising a lower-side part which is located at a lower level than the damper support section and an upper-side part which is located at a higher level than the damper support section, the lower-side part of the second loop-shaped structure section being formed by a part of the first loop-shaped structure section, the upper-side part of the second loop-shaped structure section being positioned on a rearward side, in the vehicle longitudinal direction, of the damper support section, wherein each of the first and second loop-shaped structure sections is formed by a closed-cross section portion where a closed-cross section is partitioned by plural members and/or a thick plate portion having a thicker plate thickness than a vehicle-body panel.

According to the present invention, since the first loop-shaped structure section and the second loop-shaped structure section which are formed by the closed-cross section portion and/or the thick plate portion are provided longitudinally, interposing the damper support section for the rear suspension therebetween in the vehicle longitudinal direction, the vehicle-body rigidity of the vehicle-body rear portion can be securely improved.

In an embodiment of the present invention, the first loop-shaped structure section is formed by a closed-cross section portion positioned at the vehicle-body lower wall part extending in a vehicle width direction which is formed by a floor panel and a floor cross member joined to the floor panel, closed-cross section portions positioned at each of the vehicle-body right-and-left both side wall parts extending in a vehicle vertical direction which are formed by the rear wheel house and a brace member joined to the rear wheel house and a pillar constituting an opening edge portion of a rear-door opening, and a closed-cross section portion positioned at the vehicle-body upper wall part extending in the vehicle width direction which is formed by a roof panel and a roof reinforcement joined to the roof panel.

According to this embodiment, the first loop-shaped structure section can be formed without using any particularly-large special members additionally.

In another embodiment of the present invention, the second loop-shaped structure section is formed by a closed-cross section portion positioned at the vehicle-body lower wall part extending in a vehicle width direction which is formed by a floor panel and a floor cross member joined to the floor panel, a closed-cross section portion positioned at each of the vehicle-body right-and-left both side wall parts extending in a vehicle vertical direction which is formed by the rear wheel house and a brace member joined to the rear wheel house, a thick plate portion positioned at each of the vehicle-body right-and-left both side wall parts which is formed by the damper support section and a wheel house reinforcement arranged around the damper support section, a closed-cross section portion positioned at each of the vehicle-body right-and-left both side wall parts extending in the vehicle vertical direction which is formed by a side panel and a plate member interconnecting an upper end of the rear wheel house and an upper end portion of a rear pillar and joined to the side panel, and a closed-cross section portion positioned at the vehicle-body upper wall part extending in the vehicle width direction which is formed by a roof panel and a rear header joined to the roof panel, the plate member being configured such that a vehicle component is attached thereto.

According to this embodiment, the second loop-shaped structure section can be formed without using any particularly-large special members additionally.

In another embodiment of the present invention, the vehicle component attached to the plate member is a seatbelt retractor unit, and the seatbelt retractor unit is provided with an attaching bracket which is attached to the plate member and the pillar.

According to this embodiment, since the attaching bracket of the seatbelt retractor unit is attached to the plate member and the pillar, the attaching rigidity of the seatbelt retractor unit can be improved as well as the vehicle-body rigidity.

In another embodiment of the present invention, the rear vehicle-body structure further comprises a third loop-shaped structure section provided to extend continuously along a lower wall part, right-and-left both side wall parts, and a rear wall part of the vehicle body so as to have a loop shape in a plan view, wherein the third loop-shaped structure section comprises a lower-side part which is located at a lower level than the damper support section and the lower-side part of the third loop-shaped structure section is formed by a part of the first loop-shaped structure section, and the third loop-shaped structure section is formed by a closed-cross section portion where a closed-cross section is partitioned by plural members, a thick plate portion having a thicker plate thickness than a vehicle-body panel, and/or a rigidity member including a ridgeline.

According to this embodiment, while an upper part of the first loop-shaped structure section is offset rearwardly from an upper part of the second loop-shaped structure section, this offset portion can be reinforced by the third loop-shaped structure section.

In another embodiment of the present invention, the third loop-shaped structure section is formed by a closed-cross section portion positioned at the vehicle-body lower wall part extending in a vehicle width direction which is formed by a floor panel and a floor cross member joined to the floor panel, a closed-cross section portion positioned at each of the vehicle-body right-and-left both side wall parts extending in a vehicle vertical direction which is formed by the rear wheel house and a brace member joined to the rear wheel house, a rigidity member positioned at each of the vehicle-body right-and-left both side wall parts which is formed by a gusset member which connects, in the vehicle longitudinal direction, a rear pillar and the damper support section and a wheel house reinforcement arranged around the damper support section, and a closed-cross section portion positioned at the vehicle-body rear wall part extending in the vehicle width direction which is formed by a rear end panel and a rear end cross member joined to the rear end panel.

According to this embodiment, the third loop-shaped structure section can be formed without using any particularly-large special members additionally.

In another embodiment of the present invention, the rear vehicle-body structure further comprises a damper support section for a front suspension provided at an upper part of a front wheel house, a fourth loop-shaped structure section provided in a vicinity of the damper support section for the front suspension so as to have a loop shape in the vehicle elevational view, and a fifth loop-shaped structure section provided around a door opening portion so as to have a loop shape in the vehicle side view, wherein the first loop-shaped structure section and the fifth loop-shaped structure section are connected via the pillar, and each of the fourth and fifth loop-shaped structure sections is formed by a closed-cross section portion where a closed-cross section is partitioned by plural members and/or a thick plate portion having a thicker plate thickness than the vehicle-body panel.

According to this embodiment, since the fourth loop-shaped structure section is provided in the vicinity of the damper support section for the front suspension and the first loop-shaped structure section and the fifth loop-shaped structure section are connected via the pillar, the support rigidity of the respective damper support sections for the rear and front suspensions can be efficiently improved by the vehicle's whole part and also the vehicle's handling stability can be improved.

The present invention will become apparent from the following description which refers to the accompanying drawings.

DETAILED DESCRIPTION OF THE INVENTION

Figure 1:
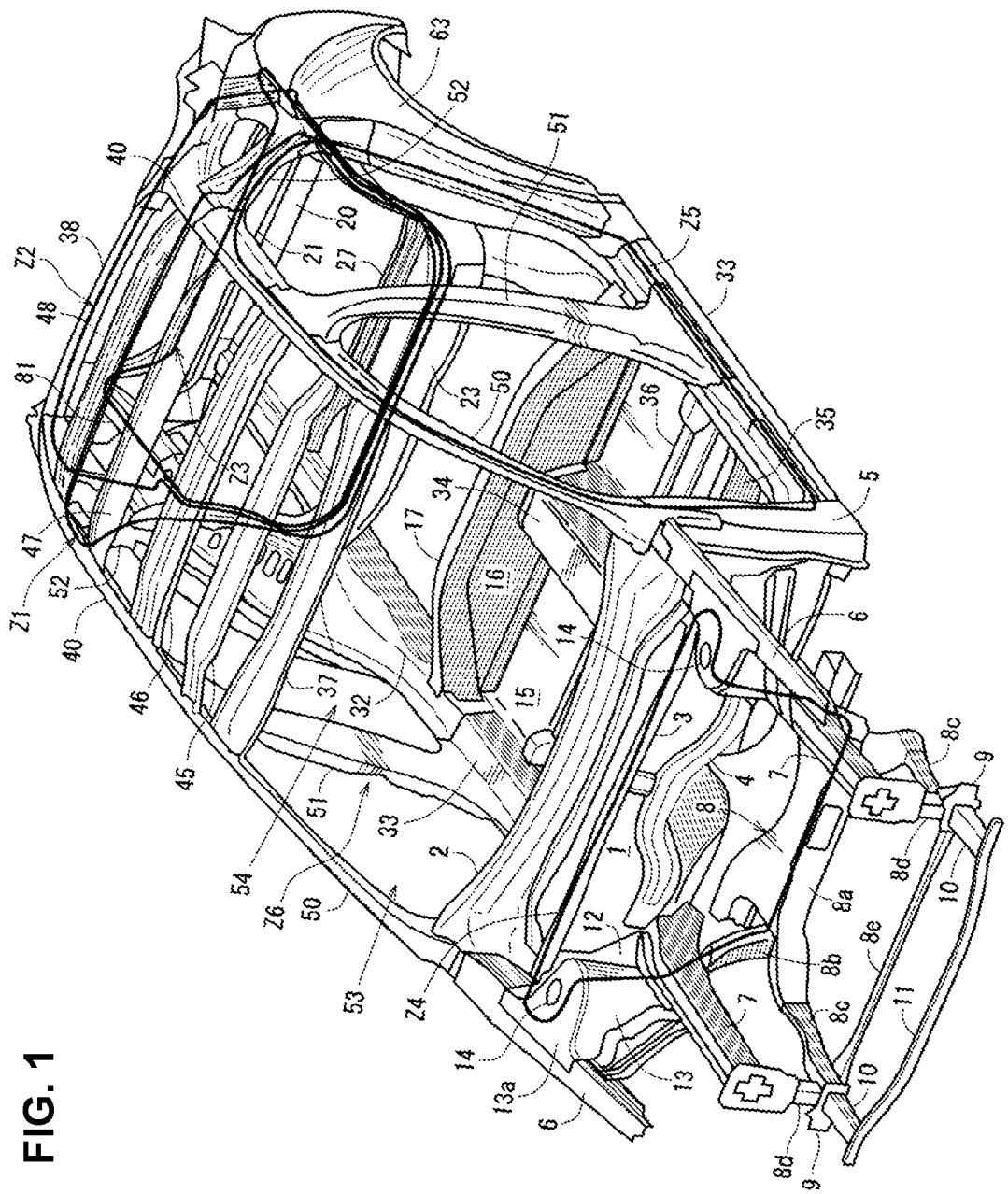
FIG. 1 is a perspective view of a vehicle-body structure of a vehicle according to the present invention, when viewed from a vehicle forward side.
Figure 2:
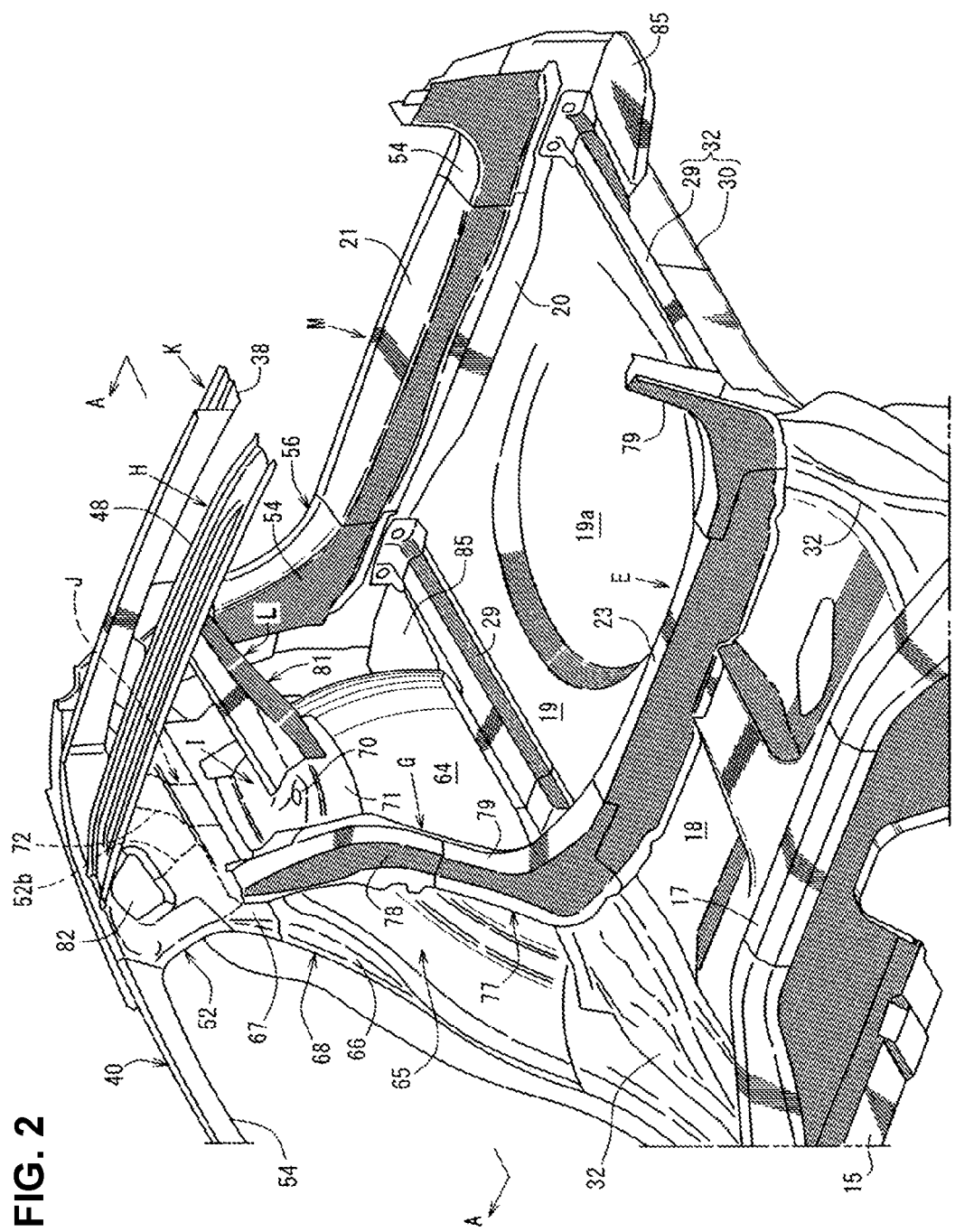
FIG. 2 is a perspective view of a rear vehicle-body structure of the vehicle.
Figure 3:
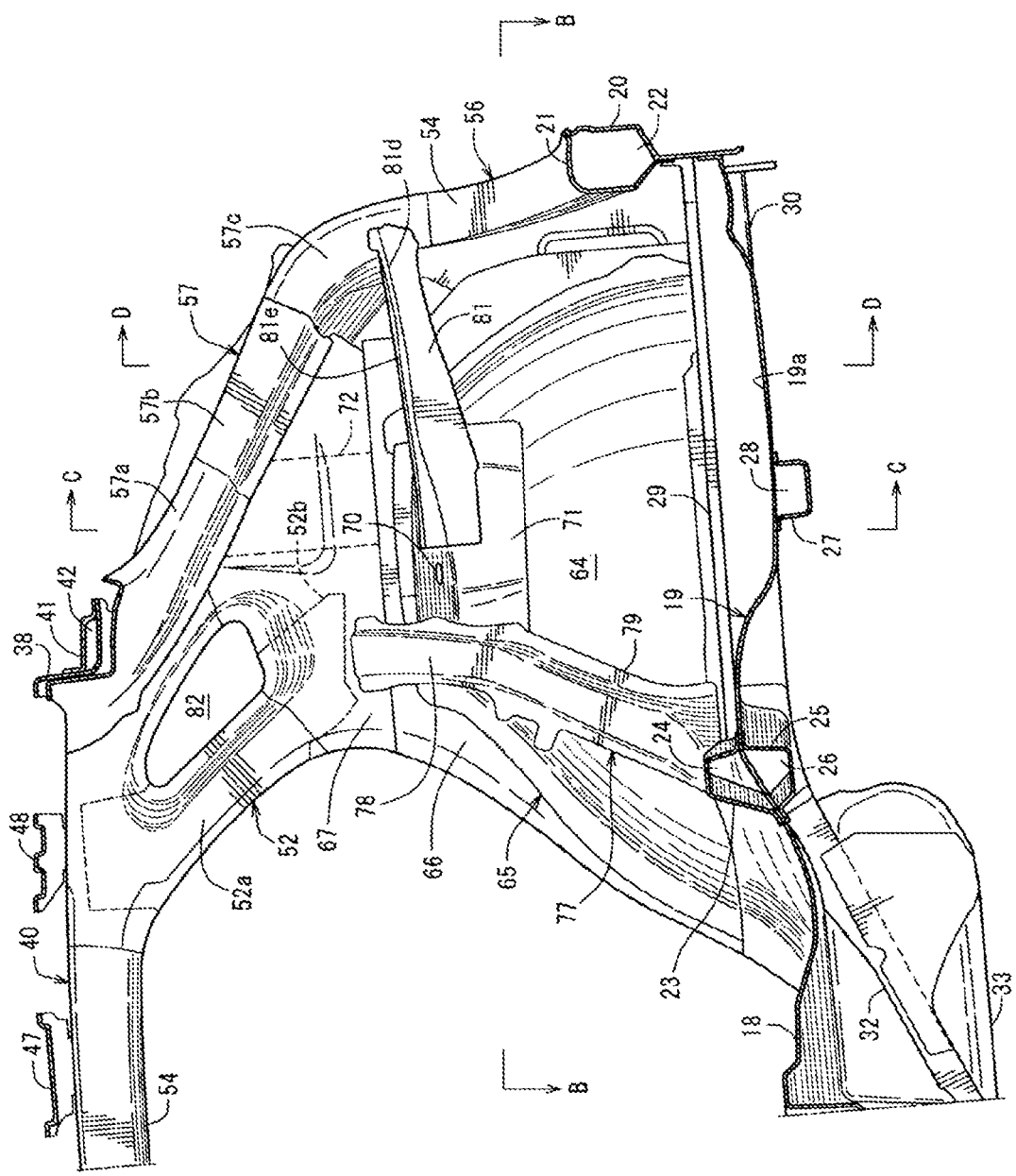
FIG. 3 is a side view of the rear vehicle-body structure of the vehicle.
Figure 4:
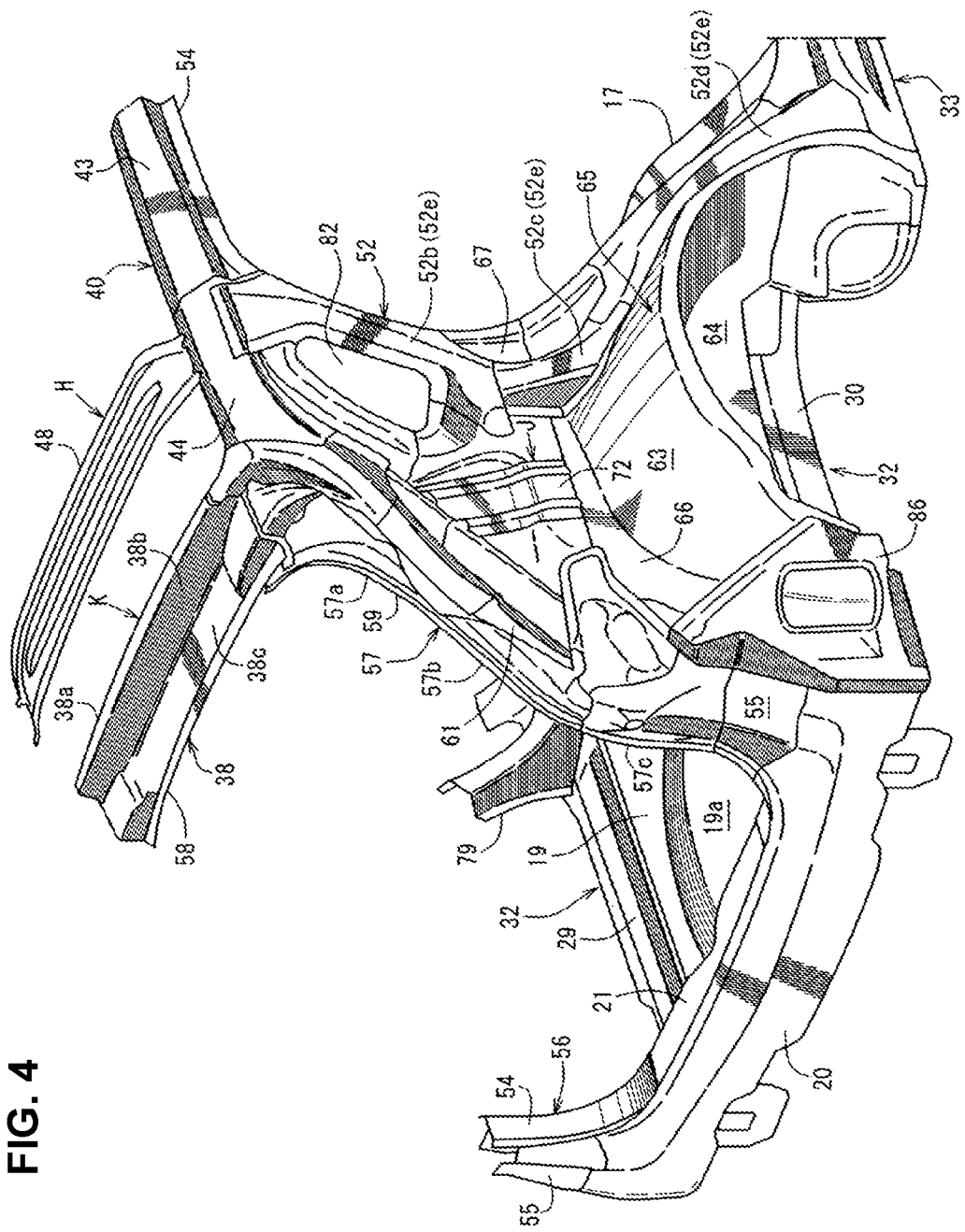
FIG. 4 is a perspective view of the rear vehicle-body structure of the vehicle, when viewed from a vehicle rearward side.
Figure 5:
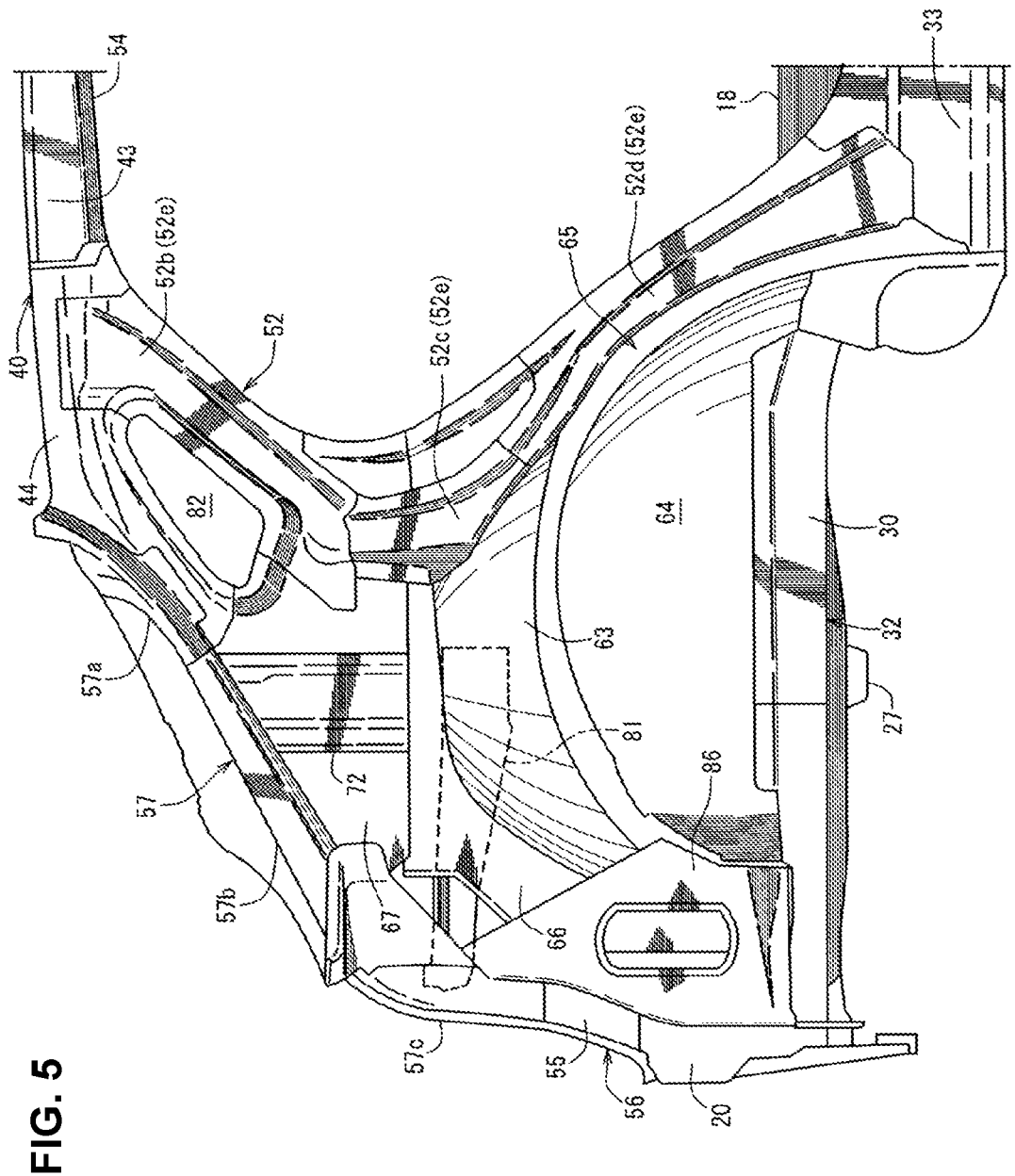
FIG. 5 is a side view of the rear vehicle-body structure of the vehicle, when viewed from a vehicle rightward side.
Figure 6:
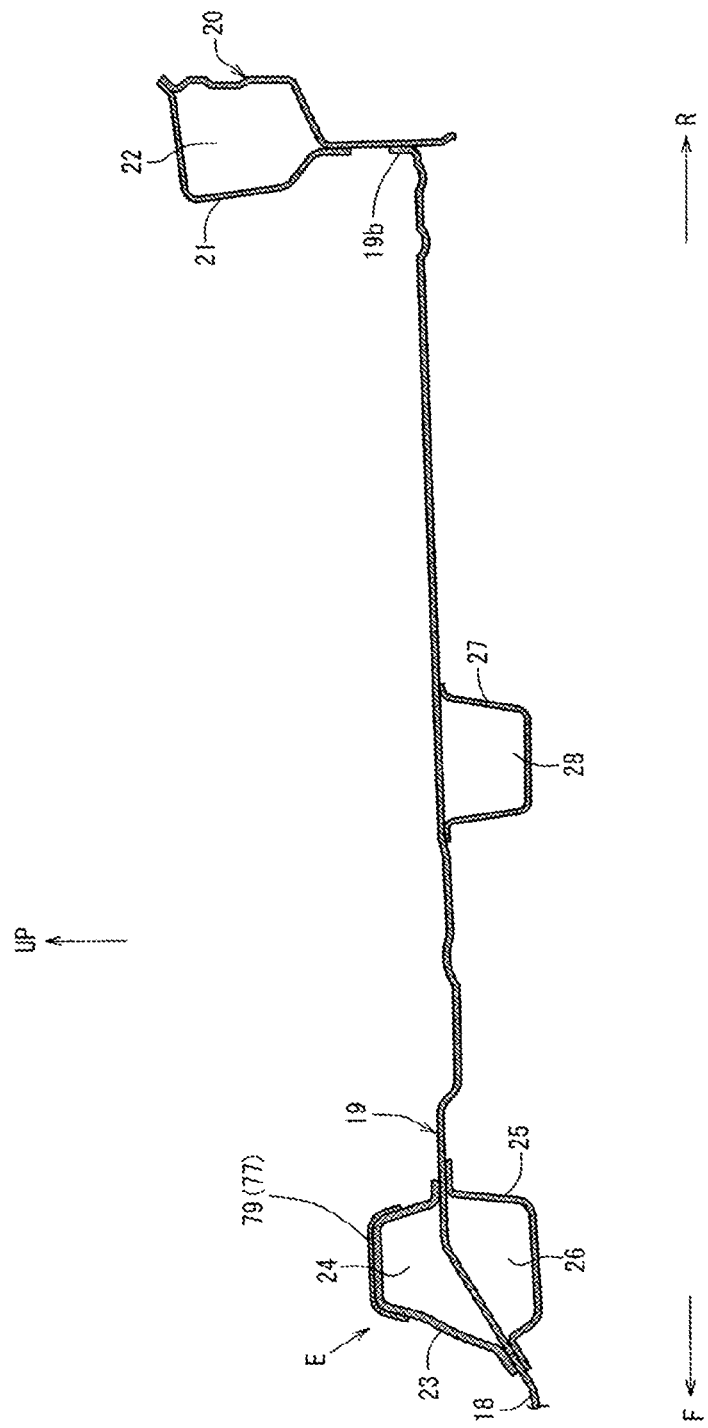
FIG. 6 is a sectional view of a rear-floor-panel side taken along line A-A of FIG. 2.
Figure 7:
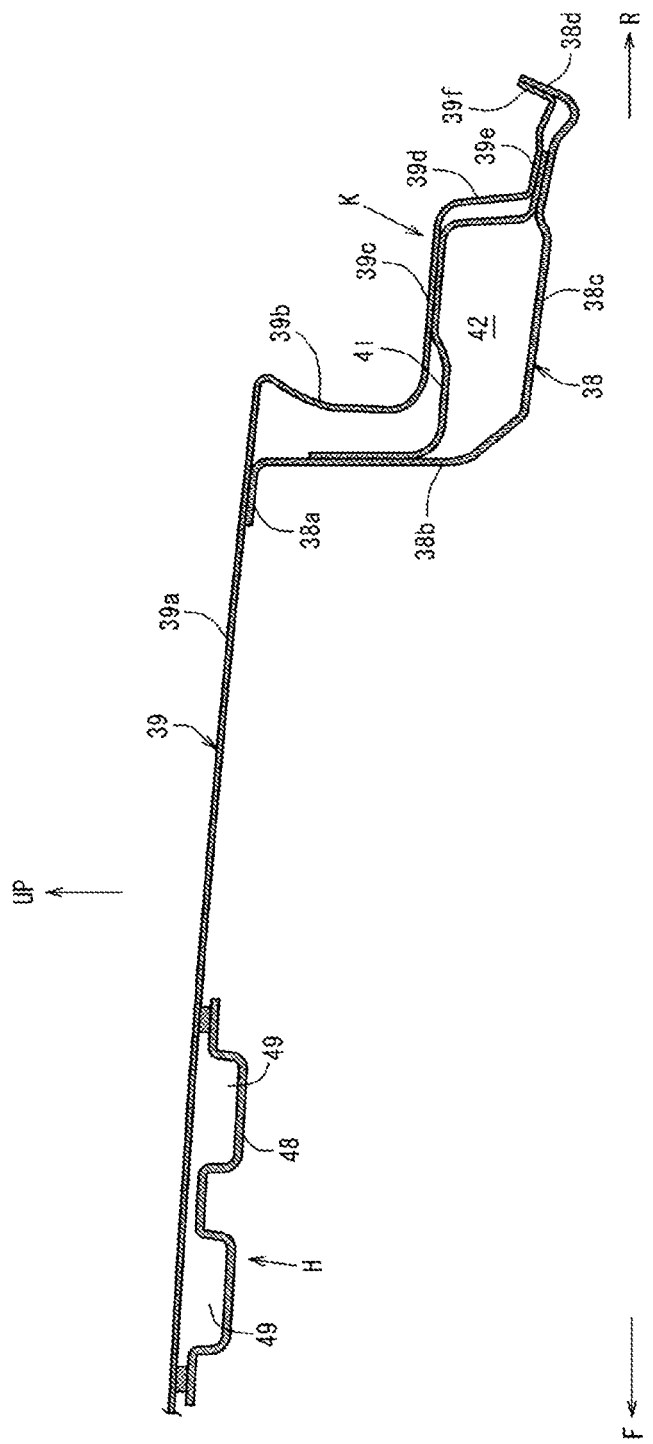
FIG. 7 is a sectional view of a roof-panel side taken along line A-A of FIG. 2.

Hereafter, an embodiment of the present invention will be described referring to the drawings. The drawings show a rear vehicle-body of a vehicle, FIG. 1 is a perspective view of a vehicle-body structure of the vehicle, when viewed from a vehicle forward side, FIG. 2 is a perspective view of the rear vehicle-body structure of the vehicle, FIG. 3 is a side view of the rear vehicle-body structure of the vehicle, FIG. 4 is a perspective view of the rear vehicle-body structure of the vehicle, when viewed from a vehicle rearward side, FIG. 5 is a side view of the rear vehicle-body structure of the vehicle, when viewed from a vehicle rightward side, FIG. 6 is a sectional view of a rear-floor-panel side taken along line A-A of FIG. 2, and FIG. 7 is a sectional view of a roof-panel side taken along line A-A of FIG. 2.

A front vehicle-body structure of the vehicle will be described referring to FIG. 1 first. A dash panel 1 which partitions, in a vehicle longitudinal direction, a cabin and an engine room is provided, and at a front side of an upper part of the dash panel 1 are provided a cowl panel 2 and a cowl cross member 3 which is fixedly joined to a lower part of the cowl panel 2, whereby a closed-cross section portion extending in a vehicle width direction is formed between the cowl panel 2 and the cowl cross member 3. A dash cross member 4 is fixedly joined to a front side of a lower part of the dash panel 1, whereby a closed-cross section portion extending in the vehicle width direction is formed between the dash panel 1 and the dash cross member 4 as well.

A hinge pillar 5 which is formed by a hinge pillar inner and a hinge pillar outer which are fixedly joined together and has a hinge-pillar closed-cross section portion extending vertically is provided at each of right-and-left both sides of the dash panel 1. There is provided an apron 6 which extends forwardly from an upper part of the hinge pillar 5. This apron 6 is formed by an apron outer and an apron inner which are fixedly joined together, whereby an apron closed-cross section portion extending in the vehicle longitudinal direction is formed.

There is provided a pair of front side frames 7 which extend forwardly from respective lower parts of right-and-left both sides of the dash panel 1. Each of the front side frames 7 is formed by a front side frame inner and a front side frame outer which are fixedly joined together, whereby a front side closed-cross section portion extending in the vehicle longitudinal direction is formed.

A front sub frame 8 to support front-suspension arms is provided below the front side frames 7. The front sub frame 8 comprises a sub frame body 8a which has a closed-cross section structure extending in the vehicle width direction, a pair of tower portions 8b which respectively have a closed-cross section structure and connect the sub frame body 8a and the respective front side frames 7, a pair of side members 8c which respectively extend forwardly from respective side portions of the sub frame body 8a, a pair of vehicle-body attaching members 8d which connect the pair of side members 8c and the pair of front side frames 7, and a front cross member 8e which interconnects respective front end portions of the pair of side members 8c.

Further, a crash can 10 is attached to a front end of each of the pair of side members 8c via a set plate and an attaching plate 9, and a lower bumper beam 11 is provided to extend in the vehicle width direction between a pair of right-and-left crash cans 10.

Moreover, a front wheel house 12 and a suspension tower portion 13 are provided between the apron 6 and the front side frame 7, the suspension tower portion 13 includes a top deck portion 13a and is formed by a thick plate portion which has a thicker plate thickness than a vehicle-body panel, and a damper support section 14 for a front suspension is formed at a nearly central part of the top deck portion 13a. That is, the damper support section 14 for the front suspension is provided at an upper part of the front wheel house 12.

As shown in FIGS. 1 and 2, a front floor panel 15 which forms a floor surface of the cabin is integrally provided at a rear end of a lower part of the dash panel 1 and a kick-up portion 16 which rises upwardly is provided at a rear end of the front floor panel 15. This kick-up portion 16 rising upwardly from the rear end of the front floor panel 15 extends rearwardly from an upper end of its rising portion, and a cross member 17 (a so-called No. 3 cross member) is attached onto the kick-up portion 16 such that a closed-cross section extending in the vehicle width direction is formed between the cross member 17 and the kick-up portion 16.

While FIG. 1 shows a state where a rear seat pan and a rear floor pan are detached for convenience shake, a rear seat pan 18 and a rear floor pan 19 are integrally provided at a rear portion of the cross member 17 as shown in FIGS. 2, 3 and 6.

The rear seat pan 18 is a part of a rear floor on which a rear seat is placed. The rear floor pan 19 is a part of the rear floor which forms the floor surface of the cabin, and a baggage-room recess portion 19a is formed at a middle part of the rear floor pan 19.

As shown in FIG. 6, a rear end panel 20 is fixedly joined to a rear-end bent portion 19b of the rear floor pan 19, and a rear end cross member 21 extending in the vehicle width direction is fixedly joined to a front side of an upper part of the rear end panel 20 such that a closed-cross section 22 extending in the vehicle width direction is formed between the rear end panel 20 and the rear end cross member 21.

As shown in FIGS. 3 and 6, a cross member upper 23 (a so-called No. 4 cross member upper) having a hat-shaped cross section is fixedly joined to an upper face of a border portion of a rear portion of the rear seat pan 18 and a front portion of the rear floor pan 19 such that a closed-cross section portion 24 extending in the vehicle width direction is formed between the cross member upper 23 and the above-described border portion.

Likewise, a cross member lower 25 (a so-called No. 4 cross member lower) having an inverse hat-shaped cross section is fixedly joined to a lower face of the border portion of the rear portion of the rear seat pan 18 and the front portion of the rear floor pan 19 such that a closed-cross section portion 26 extending in the vehicle width direction is formed between the cross member lower 25 and the above-described border portion.

Further, as shown in FIGS. 3 and 6, a rear cross member 27 (a so-called No. 4.5 cross member) having an inverse hat-shaped cross section and extending in the vehicle width direction is fixedly joined to a lower surface of a middle part, in the longitudinal direction, of the rear floor pan 19 such that a closed-cross section portion 28 extending in the vehicle width direction is formed between the rear cross member 27 and the rear floor pan 19.

As shown in FIG. 2, a rear side frame upper 29 and a rear side frame lower 30 are fixedly joined to each of end portions, in the vehicle width direction, of the rear seat pan 18 and the rear floor pan 19 such that there is provided a rear side frame 32 which has a rear-side closed-cross section portion 31 (see FIG. 11) extending in the vehicle longitudinal direction.

Herein, the cross member 17, the cross member upper 23, the cross member lower 25, and the rear cross member 27 are provided to extend in the vehicle width direction between the right-and-left rear side frames 32, 32.

As shown in FIG. 1, a front end portion of the rear side frame 32 is provided to overlap a rear end portion of each of a pair of side sills 33 which are provided at right-and-left both sides of the front floor panel 15. The side sill 33 is a vehicle-body reinforcing member having a side-sill closed-cross section portion which is formed by a side sill inner and a side sill outer which are joined together and extends in the vehicle longitudinal direction. This side sill 33 is provided to extend in the vehicle longitudinal direction between a lower portion of the hinge pillar 5 and a rear-wheel arch front portion.

As shown in FIG. 1, a tunnel portion 34 is provided to protrude toward an inside of the cabin and extends in the vehicle longitudinal direction at a central part, in the vehicle width direction, of the front floor panel 15, a front cross member 35 (a so-called No. 2 cross member) and a middle cross member 36 (a so-called No. 2.5 cross member) are provided to be spaced apart from each other in the vehicle longitudinal direction between the tunnel portion 34 and the side sill 33, and a closed-cross section portion extending in the vehicle width direction is formed between each of the cross embers 35, 36 and the front floor panel 15.

Meanwhile, as shown in FIGS. 1 and 7, a roof panel 39 is provided between a front header 37 positioned at a vehicle front part and a rear header 38 positioned at a vehicle rear part, and a pair of roof side rails 40, 40 extending in the vehicle longitudinal direction are provided below right-and-left both sides of the roof panel 39.

The front header 37 positioned at the vehicle front part interconnects the right-and-left roof side rails 40, 40 in the vehicle width direction, and adhesively fixed to a lower face of a front portion of the roof panel 39 such that a closed-cross section portion is formed between the roof panel 39 and the front header 37.

The rear header 38 positioned at the vehicle rear part comprises, as shown in FIG. 7, an upper piece portion 38*a*, a front piece portion 38*b* which extends downwardly from a rear end of the upper piece portion 38*a*, a lower piece portion 38*c* which extends rearwardly from a lower end of the front piece portion 38*b*, and a rear piece portion 38*d* which extends upwardly from a rear end of the lower piece portion 38*c*, which are integrally formed by bending. A rear header reinforcement 41 is connected to an upper part of the rear header 38, and a rear end portion of the roof panel 39 is adhesively fixed to the rear header 38.

The rear end portion of the roof panel 39 comprises, as shown in FIG. 7, a front piece portion 39*b* which extends downwardly from a rear end of a roof panel body 39*a*, a horizontal portion 39*c* which extends rearwardly from a lower end of the front piece portion 39*b*, a vertical wall portion 39*d* which extends downwardly from a rear end of the horizontal portion 39*c*, a lower piece portion 39*e* which extends rearwardly from a lower end of the vertical wall portion 39*d*, and a rear piece portion 39*f* which extends upwardly from a rear end of the lower piece portion 39*e*, which are integrally formed by bending.

The upper piece portion 38*a* of the rear header 38 is adhesively fixed to the roof panel body 39*a* of the roof panel 39, and the rear piece portion 38*d* of the rear header 38 is adhesively fixed to the rear piece portion 39*f* of the roof panel 39. A rear-header closed-cross section portion 42 extending in the vehicle width direction is formed between the rear header 38 and the rear header reinforcement 41.

The roof side rail 40 has a roof-side closed-cross section portion extending in the vehicle longitudinal direction which is formed by a roof side rail outer and a roof side rail inner which are fixedly joined together, and this roof side rail 41 is configured to be divided into plural parts in the vehicle longitudinal direction in the present embodiment. In FIGS. 4 and 5, a middle reinforcement 43 and a rear reinforcement 44 of the roof side rail 40 are shown. As shown in FIG. 1, plural roof reinforcements 45, 46, 47, 48 are provided to be space apart from each other in the vehicle longitudinal direction between the front header 37 positioned at the vehicle front part and the rear header 38 positioned at the vehicle rear part.

Each of these roof reinforcements 45-48 is a reinforcing member which extends in the vehicle width direction between the right-and-left roof side rails 40, 40, and is adhesively fixed to a lower surface of the roof panel 39 such that a roof-reinforcement closed-cross section portion is formed between the roof panel 39 and each of the roof reinforcements 45-48.

The rearmost roof reinforcement 48 is formed in a nearly W shape as shown in FIG. 1, and two roof-reinforcement closed-cross sections 49 are formed between the roof reinforcement 48 and the roof panel 39.

As shown in FIG. 1, an upper end portion of the hinge pillar 5 and a front end portion of the roof side rail 40 are interconnected by a front pillar 50 (a so-called A pillar) which extends obliquely upwardly-and-rearwardly from the hinge pillar 5. The front pillar 50 is formed by a front pillar inner and a front pillar outer which are fixedly joined together such that a front-pillar closed-cross section portion extending in a longitudinal direction of the front pillar 50 is formed therebetween.

Further, as shown in FIG. 1, a middle portion, in the longitudinal direction, of the roof side rail 40 and a middle portion, in the longitudinal direction, of the side sill 33 are interconnected by a center pillar 51 (a so-called B pillar). The center pillar 51 is formed by a center pillar inner and a center pillar outer which are fixedly joined together such that a center-pillar closed-cross section portion extending in the vertical direction is formed therebetween. Moreover, as shown in FIGS. 1, 4 and 5, a rear portion of the roof side rail 40 and a rear portion of the side sill 33 are interconnected by a middle pillar 52 (a so-called C pillar) extending substantially in the vehicle vertical direction.

As shown in FIG. 1, a space which is enclosed by the hinge pillar 5, the front pillar 50, the roof side rail 40, the center pillar 51, and the side sill 33 is formed at a front-door opening 53, and a space which is enclosed by the center pillar 51, the roof side rail 4, the middle pillar 52, and the side sill 33 is formed at a rear-door opening 54. The above-described middle pillar 52 is arranged along a rear-side opening edge of the rear-door opening 54.

As shown in FIG. 4, a corner panel 56 of a closed-cross section structure which is formed by a corner panel inner 55 and a corner panel outer 55 is connected to respective side-end portions, in the vehicle width direction, of the rear end panel 20 and the rear end cross member 21.

As shown in FIGS. 3, 4 and 5, a side portion, in the vehicle width direction, of the rear header 38 and the corner panel 56 are interconnected by a rear pillar 57 (a so-called D pillar) of a closed-cross section structure. A rear baggage-room opening 58 is formed by the rear header 38, the rear pillar 57, the corner panel 56, the rear end cross member 21, and the rear end panel 20 (see FIG. 4).

Figure 8:
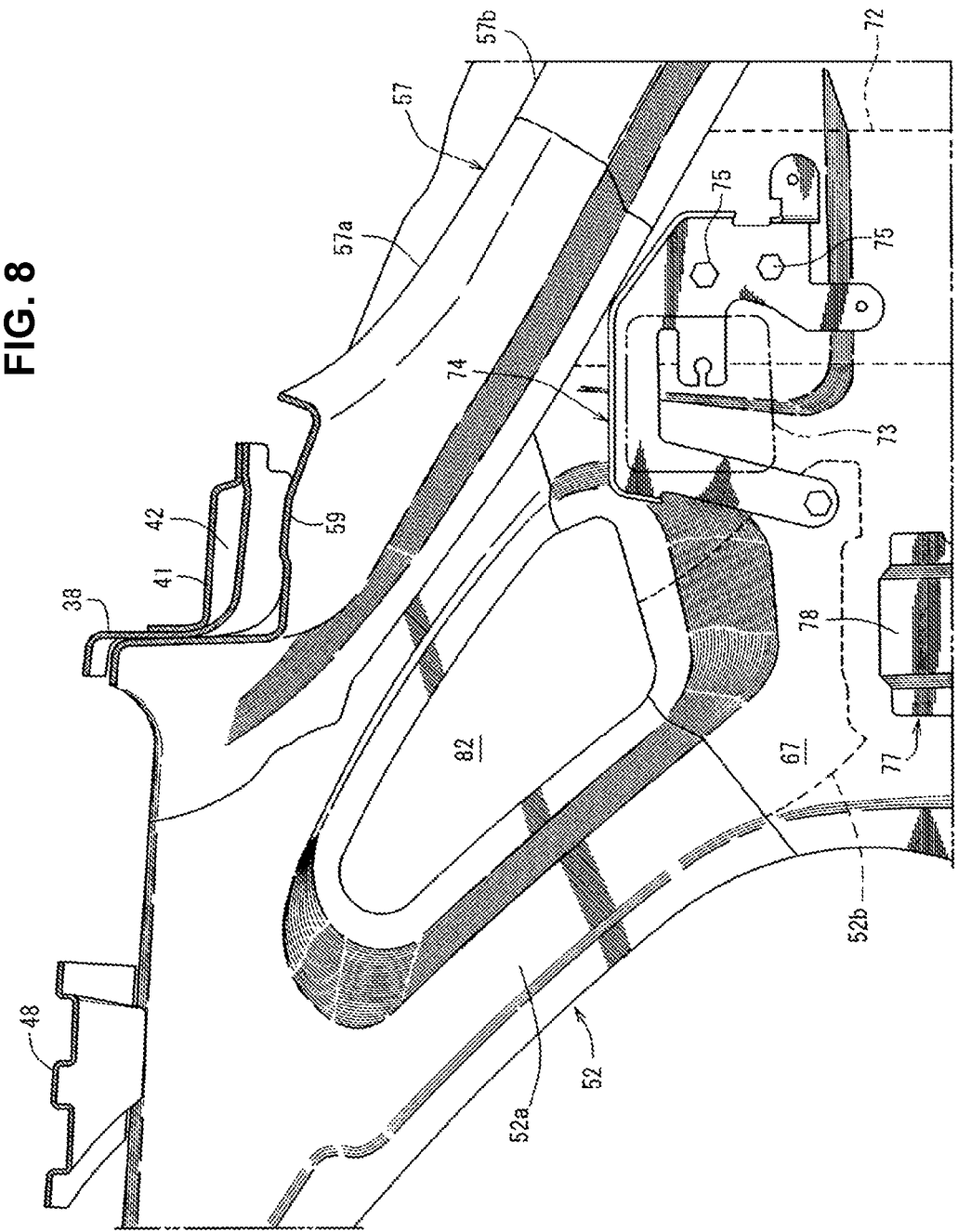
FIG. 8 is an enlarged side view of a major part of FIG. 3.
Figure 9:
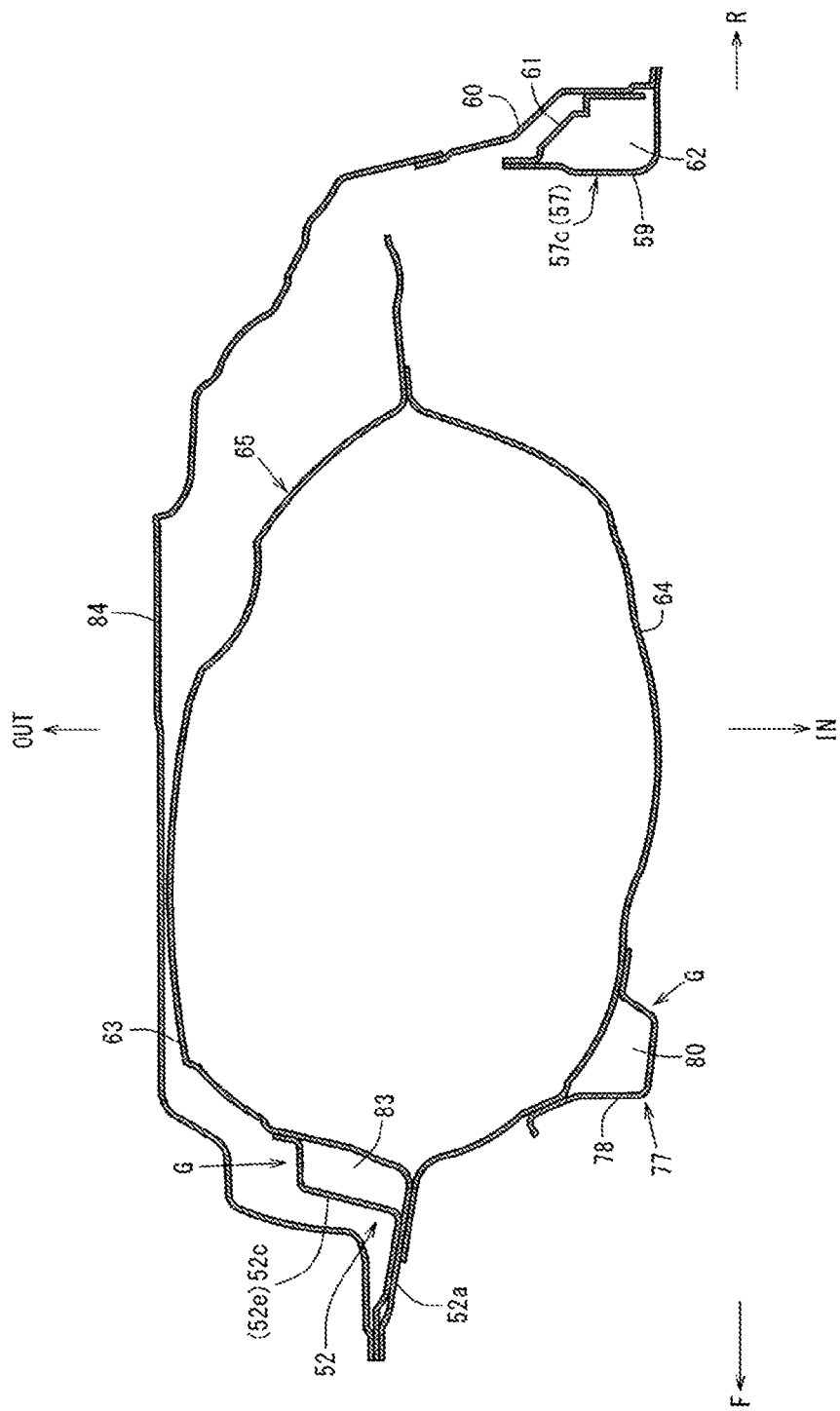
FIG. 9 is a sectional view taken along line B-B of FIG. 3.
Figure 10:
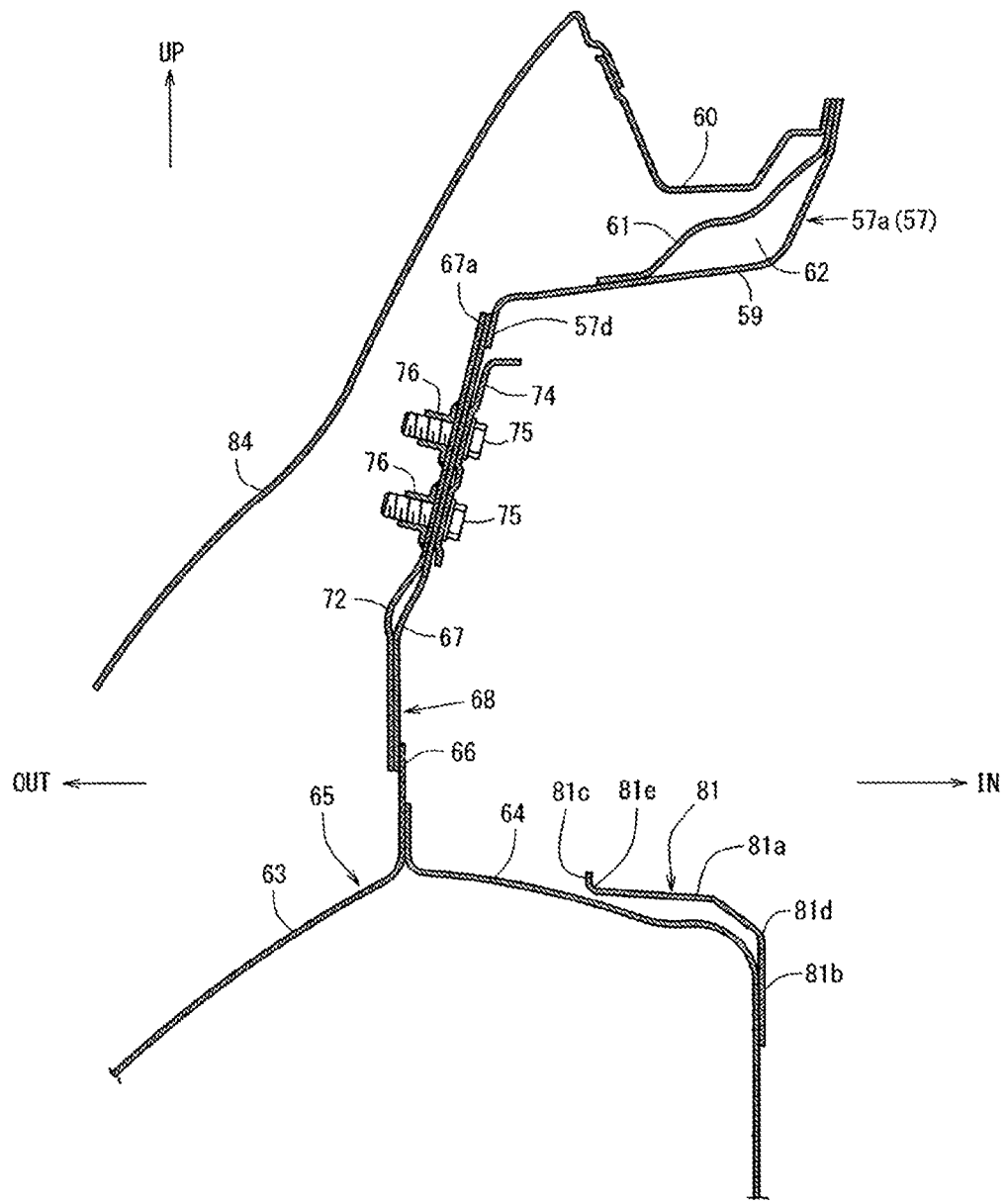
FIG. 10 is a sectional view taken along line C-C of FIG. 3.
Figure 11:
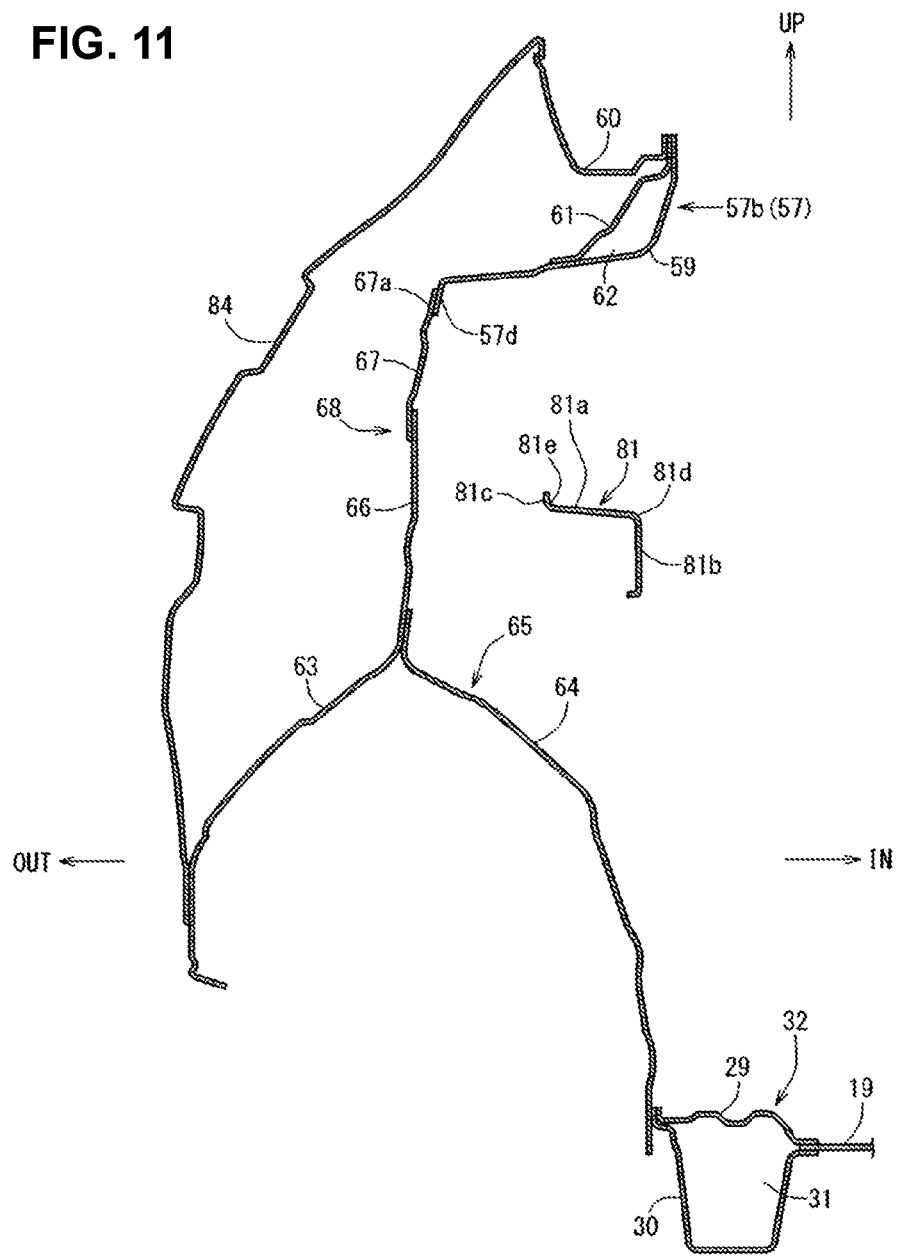
FIG. 11 is a sectional view taken along line D-D of FIG. 3.

FIG. 8 is an enlarged side view of a major part of FIG. 3, FIG. 9 is a sectional view taken along line B-B of FIG. 3, FIG. 10 is a sectional view taken along line C-C of FIG. 3, and FIG. 11 is a sectional view taken along line D-D of FIG. 3. As shown in FIG. 3, the rear pillar 57 is divided into three of an upper portion 57*a*, a middle portion 57*b*, and a lower portion 57*c* in the present embodiment.

As shown in FIGS. 9, 10 and 11, the rear pillar 57 is formed by a rear pillar inner 59, a rear pillar outer 60, and a rear pillar reinforcement 61 which are fixedly joined together, and a rear-pillar closed-cross section portion 62 which is continuous over a range of the upper portion 57*a*, the middle portion 57*b*, and the lower portion 57*c* is formed between the rear pillar reinforcement 61 and the rear pillar inner 59. As shown in FIGS. 9, 10 and 11, a rear wheel house 65 is formed by a rear wheel house outer 63 forming a side panel and a rear wheel house inner 64.

As shown in FIG. 11, a side panel inner lower 66 is provided to be upwardly continuous from the rear wheel house outer 63, and a side panel inner upper 67 is upwardly connected to the rear wheel house outer 66, wherein a side panel 68 is formed by the side panel inner lower 66 and the side panel inner upper 67. As shown in FIGS. 10 and 11, an upper end of the side panel inner upper 67 is connected to an outward-end bent portion 57*d*, in the vehicle width direction, of the rear pillar 57.

As shown in FIGS. 2 and 3, a damper support section 70 for a rear suspension is provided at an upper part of the rear wheel house inner 64 of the rear wheel house 65. A wheel house reinforcement 71 which has a thicker plate thickness than the vehicle-body panel is arranged around the damper support section 70, and this wheel house reinforcement 71 is fixedly joined to a top portion of the rear wheel house inner 64.

As shown in FIGS. 4 and 5, there is provided a plate member 72 which connects, in the vertical direction, an upper end of the rear wheel house outer 63 and the middle portion 57*b* of the rear pillar 57 and is joined to an outward-side face, in the vehicle width direction, of the side panel inner upper 67, and a closed-cross section portion extending in the vertical direction is formed between the plate member 72 and the side panel inner upper 67.

As shown in FIGS. 8 and 10, an attaching bracket 74 to attach a seatbelt retractor unit 73 as a vehicle component is fixedly fastened, together with the plate member 72, to a cabin side of the side panel inner upper 67 where the above-described plate member 72 is provided by using bolts 75 and weld nuts 76. The seatbelt retractor unit 73 is attached to the plate member 72 via the attaching bracket 74.

The above-described attaching bracket 74 is attached to the plate member 72 and a middle-pillar upper reinforcement 52*b* of the middle pillar 52. In other words, the seatbelt retractor unit 73 is provided with the attaching bracket 74 attached to the plate member 72 and the middle pillar 52. As shown in FIGS. 2 and 3, there is provided a brace member 77 which extends in the vertical direction from a cabin side of the rear wheel house inner 64 to a side portion, in the vehicle width direction, of the cross member upper 23.

In the present embodiment, the brace member 77 is configured to be vertically divided into an upper brace member 78 and a lower brace member 79, the upper brace member 78 is fixedly joined to the side panel inner upper 67, the side panel inner lower 66, the wheel house reinforcement 71, and the rear wheel house inner 64, the lower brace member 79 is fixedly joined to the rear wheel house inner 64 and the cross member upper 23, and as shown in FIG. 9, a closed-cross section 80 extending in the vertical direction is formed between the upper-and-lower brace members 78, 79 and the respective members 67, 66, 71, 64, 23. As shown in FIGS. 3, 10 and 11, there is provided a gusset member 81 which connects, in the vehicle longitudinal direction, the lower portion 57*c* of the rear pillar 57 and the damper support section 70 as well as the wheel house reinforcement 71 arranged around the damper support section 70.

As shown in the same figures, the gusset member 81 comprises an upper wall portion 81*a*, a lower wall portion 81*b* which extends downwardly from an inward end, in the vehicle width direction, of the upper wall portion 81*a*, a flange portion 81*c* which extends upwardly from an outward end, in the vehicle width direction, of the upper wall portion 81*a*, a ridgeline 81*d* which extends in the vehicle longitudinal direction along a longitudinal direction of the gusset member 81 provided between the upper wall portion 81*a* and the lower wall portion 81*b*, and a ridgeline 81*e* which extends in the vehicle longitudinal direction along the longitudinal direction of the gusset member 81 provided between the upper wall portion 81*a* and the flange portion 81*c*. That is, the gusset member 81 is a rigidity member which includes the ridgelines 81*d*, 81*e*.

As shown in FIGS. 3, 4 and 5, the above-described middle pillar 52 (the so-called C pillar) has a closed-cross section portion extending in the longitudinal direction thereof which is formed by a middle pillar inner 52*a* and middle-pillar reinforcements, which will be below. A middle-pillar upper reinforcement 52*b*, a middle-pillar middle reinforcement 52*c*, and a middle-pillar lower reinforcement 52*d* are fixedly joined to an outward-side face, in the vehicle width direction, of the middle pillar inner 52*a*.

As shown in FIGS. 4 and 5, the middle-pillar upper reinforcement 52*b* is positioned between a rear-side upper opening edge of the rear-door opening 54 and a front edge of an opening portion 82 for a quarter window, the middle-pillar middle reinforcement 52*c* is fixedly joined to the side panel inner upper 67, the side panel inner lower 66, and a front upper portion of the rear wheel house outer 63, and the middle-pillar lower reinforcement 52*d* is fixedly joined to a front edge portion of the rear wheel house outer 63.

As shown in FIG. 9, a closed-cross section portion 83 extending in the longitudinal direction of the middle pillar 52 is formed between the middle pillar inner 52*a* and the middle-pillar reinforcement 52*e* which is formed by the middle-pillar upper reinforcement 52*b*, the middle-pillar middle reinforcement 52*c*, and the middle-pillar lower reinforcement 52*d*.

As shown in FIGS. 9, 10 and 11, a whole part of the rear vehicle body which extends from an upper edge portion of the rear pillar outer 60 to a lower edge portion of the rear wheel house outer 63 and a front edge portion of the middle pillar 52, excluding the opening portion 82 for the quarter window, is covered with a side frame outer 85 as a vehicle-body outer plate, illustration of which is omitted in FIGS. 4 and 5. Herein, reference character 85 denotes a front side panel in FIG. 2, and reference character 86 denotes a rear side panel in FIGS. 4 and 5.

While a loop-shaped structure section will be described referring to FIGS. 1, 2 and others, this loop-shaped structure section (a so-called loop-shaped vehicle-body framework) is formed by the closed-cross section portion, the thick plate portion having the thicker plate thickness than the vehicle-body panel, and/or the rigidity member including the ridgeline.

There is provided a first loop-shaped structure section Z1 which is provided to extend continuously along a lower wall part E of the vehicle body which extends in the vehicle width direction, right-and-left both side wall parts G, G of the vehicle body which extend in the vertical direction, and an upper wall part H of the vehicle body which is provided at a vehicle-body upper part and extends in the vehicle width direction so as to have a loop shape in a vehicle elevational view and is positioned on the forward side, in the vehicle longitudinal direction, of the damper support section 70.

The first loop-shaped structure section Z1 is formed by a closed-cross section portion 24 positioned at the vehicle-body lower wall part E which is formed by the rear floor pan 19 and the cross member upper 23 as a floor cross member (see FIG. 6), closed-cross section portions 80, 83 positioned at each of the vehicle-body right-and-left both side wall parts G, G which are respectively formed by the rear wheel house inner 64 and the brace member 77 and the middle pillar 52 constituting the rear-side opening edge portion of the rear-door opening 54 (see FIG. 9), and a closed-cross section portion 49 positioned at the vehicle-body upper wall part H which is formed by the roof panel 39 and the roof reinforcement 48 (see FIG. 7).

Moreover, there is provided a second loop-shaped structure section Z2 which is provided to extend continuously along the lower wall part E, right-and-left both side wall parts G, G, I, I, J, J, and an upper wall part K of the vehicle body so as to have a loop shape in the vehicle elevational view. Herein, the second loop-shaped structure section Z2 comprises a lower-side part which is located at a lower level than the damper support section 70 and an upper-side part which is located at a higher level than the damper support section 70, wherein the lower-side part of the second loop-shaped structure section Z2 is formed by a part of the above-described first loop-shaped structure section Z1 and the upper-side part of the second loop-shaped structure section Z2 is positioned on the rearward side, in the vehicle longitudinal direction, of the damper support section 70.

The second loop-shaped structure section Z2 is formed by the closed-cross section portion 24 positioned at the vehicle-body lower wall part E extending in the vehicle width direction which is formed by the rear floor pan 19 and the cross member upper 23 as the floor cross member (see FIG. 6), the closed-cross section portion 80 positioned at each of the vehicle-body right-and-left both side wall parts G, G extending in the vertical direction which is formed by the rear wheel house inner 64 and the brace member 77 (see FIG. 9), the thick plate portion (see the wheel house reinforcement 71 itself) positioned at each of the vehicle-body right-and-left both side wall parts I, I which is formed by the damper support section 70 and the wheel house reinforcement 71 arranged around the damper support section 70, another closed-cross section portion positioned at each of the vehicle-body right-and-left both side wall parts J, J extending in the vertical direction which is formed by the side panel 68 and the plate member 72 which interconnects the upper end of the rear wheel house 65 and the upper end portion of the rear pillar 57 and is joined to the side panel 38, and the closed-cross section 42 positioned at the vehicle-body upper wall part K extending in the vehicle width direction which is formed by the roof panel 39 and the rear header 38 (see FIGS. 3 and 7), wherein the plate member 72 is configured such that the seatbelt retractor unit 73 as a vehicle component is attached thereto. As shown in FIGS. 1 and 2, there is provided a third loop-shaped structure section Z3 which is configured to have a loop shape in a plan view.

The third loop-shaped structure section Z3 is provided to extend continuously along the lower wall part E, right-and-left both side wall parts G, L, and a rear wall part M of the vehicle body so as to have a loop shape in the plan view. Herein, the third loop-shaped structure section Z3 comprises a lower-side part which is located at a lower level than the damper support section 70, and this lower-side part is formed by a part of the above-described first loop-shaped structure section Z1.

The third loop-shaped structure section Z3 is formed by the closed-cross section portion 24 positioned at the vehicle-body lower wall part E extending in the vehicle width direction which is formed by the rear floor panel 19 and the cross member upper 23 (see FIG. 6), the closed-cross section portion 80 positioned at each of the vehicle-body right-and-left both side wall parts G, G extending in the vertical direction which is formed by the rear wheel house 65 and the brace member 77 (see FIG. 9), a rigidity member (see the gusset member 81 including the ridgelines 81d, 81e) positioned at each of the vehicle-body right-and-left both side wall parts L, L which is formed by the gusset member 81 which connects, in the vehicle longitudinal direction, the rear pillar 57 and the damper support section 70 and the wheel house reinforcement 71 arranged around the damper support section 70, and the closed-cross section 22 positioned at the vehicle-body rear wall part M extending in the vehicle width direction which is formed by the rear end panel 20 and the rear end cross member 21 (see FIGS. 3 and 6).

As shown in FIG. 1, there are further provided the damper support section 14 for the front suspension which is provided at the upper part of the front wheel house 12, a fourth loop-shaped structure section Z4 which is provided in the vicinity of the damper support section 14 for the front suspension so as to have a loop shape in the vehicle elevational view, and a fifth loop-shaped structure section Z5 which is provided around the front-door opening 53 and the rear-door opening 54 so as to have a loop shape in the vehicle side view. Herein, the first loop-shaped structure section Z1 and the fifth loop-shaped structure section Z5 are connected via the above-described middle pillar 52.

As shown in FIG. 1, the fourth loop-shaped structure section Z4 comprises the right-and-left suspension tower portions 13 provided with the top deck portions 13a which are formed as a thick plate portion, the right-and-left tower portions 8b of the closed-cross section structure which are connected to the right-and-left front side frames 7, the sub frame body 8a extending in the vehicle width direction, and the closed-cross section portion extending in the vehicle width direction which is formed by the cowl panel 2 and the cowl cross member 3.

Further, as shown in FIG. 1, the fifth loop-shaped structure section Z5 comprises the hinge pillar 5 of the closed-cross section structure which extends in the vertical direction, the front pillar 50 of the closed-cross section structure which extends obliquely upwardly-and-rearwardly, the roof side rail 40 of the closed-cross section structure which extends in the vehicle longitudinal direction at the vehicle-body upper part, the middle pillar 52 of the closed-cross section structure, and the side sill 33 of the closed-cross section which extends in the vehicle longitudinal direction at the vehicle-body lower part. Moreover, as shown in FIG. 1, a sixth loop-shaped structure section Z6 is formed at a middle position, in the longitudinal direction, between the fourth loop-shaped structure section Z4 and the first loop-shaped structure section Z1 so as to have a loop shape in the vehicle elevational view.

As shown in the same figure, the sixth loop-shaped structure section Z6 is formed by a closed-cross section portion positioned at a vehicle-body lower wall part extending in the vehicle width direction which is formed by the front floor panel 15 and the middle cross member 36, another closed-cross section portion positioned at each of vehicle-body right-and-left both side wall parts extending in the vertical direction which is formed by the center pillar 51, and another closed-cross section portion positioned at a vehicle-body upper wall part extending in the vehicle width direction which is formed by the roof panel 39 and the roof reinforcement 46. Herein, in the figures, an arrow F shows a vehicle front (forward) side, an arrow R shows a vehicle rear (rearward) side, an arrow IN shows a vehicle inward side in the vehicle width direction, an arrow OUT shows a vehicle outward side in the vehicle width direction, and an arrow UP shows a vehicle upward side.

As described above, the rear vehicle-body structure of the vehicle of the present embodiment comprises the damper support section 70 for the rear suspension provided at the upper part of the rear wheel house 65, the first loop-shaped structure section Z1 provided to extend continuously along the lower wall part E, the right-and-left both side wall parts G, and the upper wall part H of the vehicle body so as to have the loop shape in the vehicle elevational view, the first loop-shaped structure section Z1 being positioned on the forward side, in the vehicle longitudinal direction, of the damper support section 70, and the second loop-shaped structure section Z2 provided to extend continuously along the lower wall part E of the vehicle body, the right-and-left both side wall parts G, I, J of the vehicle body, and the upper wall part K of the vehicle body so as to have the loop shape in the vehicle elevational view, the second loop-shaped structure section Z2 comprising the lower-side part which is located at the lower level than the damper support section 70 and the upper-side part which is located at the higher level than the damper support section 70, the lower-side part of the second loop-shaped structure section Z2 being formed by a part of the first loop-shaped structure section Z1, the upper-side part of the second loop-shaped structure section Z2 being positioned on the rearward side, in the vehicle longitudinal direction, of the damper support section 70, wherein each of the first and second loop-shaped structure sections Z1, Z2 is formed by the closed-cross section portion where the closed-cross section is partitioned by the plural members and/or the thick plate portion (the wheel house reinforcement 71) having the thicker plate thickness than the vehicle-body panel (see FIGS. 2 and 3).

According to this structure, since the first loop-shaped structure section Z1 and the second loop-shaped structure section Z2 which are formed by the closed-cross section portion and/or the thick plate portion are provided longitudinally, interposing the damper support section 70 for the rear suspension therebetween in the vehicle longitudinal direction, the vehicle-body rigidity of the vehicle-body rear portion can be securely improved.

Further, in the present embodiment, the first loop-shaped structure section Z1 is formed by the closed-cross section portion 24 positioned at the vehicle-body lower wall part E extending in the vehicle width direction which is formed by the floor panel (see the rear floor pan 19) and the floor cross member (see the cross member upper 23) joined to this floor panel, the closed-cross section portions 80, 83 positioned at each of the vehicle-body right-and-left both side wall parts G extending in the vehicle vertical direction which are formed by the rear wheel house 65 and the brace member 77 joined to the rear wheel house 65 and the middle pillar 52 constituting the opening edge portion of the rear-door opening 54, and the closed-cross section portion 49 positioned at the vehicle-body upper wall part H extending in the vehicle width direction which is formed by the roof panel 39 and the roof reinforcement 48 joined to the roof panel 39 (see FIGS. 2, 6, 7 and 9).

According to this structure, the first loop-shaped structure section Z1 can be formed without using any particularly-large special members additionally.

Moreover, in the present embodiment, the second loop-shaped structure section Z2 is formed by the closed-cross section portion 24 positioned at the vehicle-body lower wall part E extending in a vehicle width direction which is formed by the floor panel (the rear floor pan 19) and the floor cross member (the cross member upper 23) joined to this floor panel, the closed-cross section portion 80 positioned at each of the vehicle-body right-and-left both side wall parts G extending in the vehicle vertical direction which is formed by the rear wheel house 65 and the brace member 77 joined to the rear wheel house 65, the thick plate portion positioned at each of the vehicle-body right-and-left both side wall parts I which is formed by the damper support section 70 and the wheel house reinforcement 71 arranged around the damper support section 70, the closed-cross section portion positioned at each of the vehicle-body right-and-left both side wall parts J extending in the vehicle vertical direction which is formed by the side panel 68 and the plate member 72 interconnecting the upper end of the rear wheel house 65 and the upper end portion of the rear pillar 57 and joined to the side panel 68, and the closed-cross section portion 42 positioned at the vehicle-body upper wall part K extending in the vehicle width direction which is formed by the roof panel 39 and the rear header 38 joined to the roof panel 39, the plate member being configured such that the vehicle component (see the seatbelt retractor unit 73) is attached thereto (see FIGS. 2, 3, 6, 7 and 9).

According to this structure, the second loop-shaped structure section Z2 can be formed without using any particularly-large special members additionally.

Also, in the present embodiment, the above-described vehicle component attached to the plate member 72 is the seatbelt retractor unit 73, and the seatbelt retractor unit 73 is provided with the attaching bracket 74 which is attached to the plate member 72 and the middle pillar 52 (see the middle-pillar upper reinforcement 52b particularly) (see FIGS. 8 and 10).

According to this structure, since the attaching bracket 74 of the seatbelt retractor unit 73 is attached to the plate member 72 and the middle pillar 52, the attaching rigidity of the seatbelt retractor unit 73 can be improved as well as the vehicle-body rigidity.

Additionally, in the present embodiment, the rear vehicle-body structure further comprises the third loop-shaped structure section Z3 provided to extend continuously along the lower wall part E, the right-and-left both side wall parts G, L, and the rear wall part M of the vehicle body so as to have the loop shape in the plan view, wherein the third loop-shaped structure section Z3 comprises the lower-side part which is located at the lower level than the damper support section 70 and the lower-side part of the third loop-shaped structure section Z3 is formed by a part of the first loop-shaped structure section Z1, and the third loop-shaped structure section Z3 is formed by the closed-cross section portions 24, 80, 22 where the closed-cross sections are respectively partitioned by plural members, the thick plate portion (the wheel house reinforcement 71) having the thicker plate thickness than the vehicle-body panel, and/or the rigidity member (see the gusset member 81) including the ridgelines 81d, 81e (see FIGS. 2, 6 and 9).

According to this structure, while the upper part of the first loop-shaped structure section Z1 is offset rearwardly from the upper part of the second loop-shaped structure section Z2, this offset portion can be reinforced by the third loop-shaped structure section Z3.

Further, in the present embodiment, the third loop-shaped structure section Z3 is formed by the closed-cross section portion 24 positioned at the vehicle-body lower wall part E extending in the vehicle width direction which is formed by the floor panel (the rear floor pan 19) and the floor cross member (the cross member upper 23) joined to this floor panel, the closed-cross section portion 80 positioned at each of the vehicle-body right-and-left both side wall parts G extending in the vehicle vertical direction which is formed by the rear wheel house 65 and the brace member 77 joined to the rear wheel house 65, the rigidity member (the gusset member 81 including the ridgelines 81d, 81e) positioned at each of the vehicle-body right-and-left both side wall parts L which is formed by the gusset member 81 which connects, in the vehicle longitudinal direction, the rear pillar 57 and the damper support section 70 and the wheel house reinforcement 71 arranged around the damper support section 70, and the closed-cross section portion 22 positioned at the vehicle-body rear wall part M extending in the vehicle width direction which is formed by the rear end panel 20 and the rear end cross member 21 joined to the rear end panel 20 (see FIGS. 2, 3, 6 and 9-11).

According to this structure, the third loop-shaped structure section Z3 can be formed without using any particularly-large special members additionally.

In the present embodiment, the rear vehicle-body structure further comprises the damper support section 14 for the front suspension provided at the upper part of the front wheel house 12, the fourth loop-shaped structure section Z4 provided in the vicinity of the damper support section 14 for the front suspension so as to have the loop shape in the vehicle elevational view, and the fifth loop-shaped structure section Z5 provided around the door opening portions 53, 54 so as to have the loop shape in the vehicle side view, wherein the first loop-shaped structure section Z1 and the fifth loop-shaped structure section Z5 are connected via the middle pillar 52, and each of the fourth and fifth loop-shaped structure sections Z4, Z5 is formed by the closed-cross section portion where the closed-cross section is partitioned by the plural members and/or the thick plate portion (see the suspension tower 13, the top deck portion 13a) having the thicker plate thickness than the vehicle-body panel (see FIG. 1).

According to this structure, since the fourth loop-shaped structure section Z4 is provided in the vicinity of the damper support section 14 for the front suspension and the first loop-shaped structure section Z1 and the fifth loop-shaped structure section Z5 are connected via the middle pillar 52, the support rigidity of the respective damper support sections 14, 70 for the rear and front suspensions can be efficiently improved by the vehicle's whole part and also the vehicle's handling stability can be improved.

In correspondence between the present invention and the above-described embodiment, the floor panel of the present invention corresponds to the rear floor pan 19 of the embodiment. Likewise, the floor cross member corresponds to the cross member upper 23, the vehicle component corresponds to the seatbelt retractor unit 73, the thick plate portion corresponds to the wheel house reinforcement 71 (the second loop-shaped structure section Z2) and the suspension tower 13 and its top deck portion 13a (the fourth loop-shaped structure section Z4), and the rigidity member including the ridgeline corresponds to the gusset member 81. However, the present invention should not be limited to the above-described embodiment and any other modifications or improvements may be applied within the scope of a spirit of the present invention.

What is claimed is:

1. A rear vehicle-body structure of a vehicle, comprising:
a damper support section for a rear suspension provided at an upper part of a rear wheel house;
a first loop-shaped structure section provided to extend continuously along a lower wall part, right-and-left both side wall parts, and an upper wall part of a vehicle body so as to have a loop shape in a vehicle elevational view, the first loop-shaped structure section being positioned on a forward side, in a vehicle longitudinal direction, of said damper support section; and
a second loop-shaped structure section provided to extend continuously along a lower wall part, right-and-left both side wall parts, and an upper wall part of the vehicle body so as to have a loop shape in the vehicle elevational view, the second loop-shaped structure section comprising a lower-side part which is located at a lower level than said damper support section and an upper-side part which is located at a higher level than said damper support section, the lower-side part of the second loop-shaped structure section being formed by a part of said first loop-shaped structure section, the upper-side part of the second loop-shaped structure section being positioned on a rearward side, in the vehicle longitudinal direction, of said damper support section, wherein each of said first and second loop-shaped structure sections is formed by a closed-cross section portion where a closed-cross section is partitioned by plural members and/or a thick plate portion having a thicker plate thickness than a vehicle-body panel, and said second loop-shaped structure section is formed by a closed-cross section portion positioned at said vehicle-body lower wall part extending in a vehicle width direction which is formed by a floor panel and a floor cross member joined to the floor panel, a closed-cross section portion positioned at each of said vehicle-body right-and-left both side wall parts extending in a vehicle vertical direction which is formed by the rear wheel house and a brace member joined to said rear wheel house, a thick plate portion positioned at each of said vehicle-body right-and-left both side wall parts which is formed by said damper support section and a wheel house reinforcement arranged around the damper support section, a closed-cross section portion positioned at each of said vehicle-body right-and-left both side wall parts extending along the vehicle vertical direction which is formed by a side panel and a plate member interconnecting an upper end of the rear wheel house and an upper end portion of a rear pillar along the vehicle vertical direction and joined to the side panel, and a closed-cross section portion positioned at said vehicle-body upper wall part extending in the vehicle width direction which is formed by a roof panel and a rear header joined to the roof panel, the plate member being configured such that a vehicle component is attached thereto.

2. The rear vehicle-body structure of the vehicle of claim 1, wherein said first loop-shaped structure section is formed by a closed-cross section portion positioned at said vehicle-body lower wall part extending in a vehicle width direction which is formed by a floor panel and a floor cross member joined to the floor panel, closed-cross section portions positioned at each of said vehicle-body right-and-left both side wall parts extending in a vehicle vertical direction which are formed by the rear wheel house and a brace member joined to said rear wheel house and a pillar constituting an opening edge portion of a rear-door opening, and a closed-cross section portion positioned at said vehicle-body upper wall part extending in the vehicle width direction which is formed by a roof panel and a roof reinforcement joined to the roof panel.

3. The rear vehicle-body structure of the vehicle of claim 1, wherein said vehicle component attached to said plate member is a seatbelt retractor unit, and said seatbelt retractor unit is provided with an attaching bracket which is attached to the plate member and said pillar.

4. The rear vehicle-body structure of the vehicle of claim 1, further comprising a third loop-shaped structure section provided to extend substantially continuously along a lower wall part, right-and-left both side wall parts, and a rear wall part of the vehicle body so as to have a loop shape in a plan view, wherein said third loop-shaped structure section comprises a lower-side part which is located at a lower level than said damper support section and said lower-side part of the third loop-shaped structure section is formed by a part of said first loop-shaped structure section, and said third loop-shaped structure section is formed by a closed-cross section portion where a closed-cross section is partitioned by plural members, a thick plate portion having a thicker plate thickness than a vehicle-body panel, and/or a rigidity member including a ridgeline.

5. The rear vehicle-body structure of the vehicle of claim 4, wherein said third loop-shaped structure section is formed by a closed-cross section portion positioned at said vehicle-body lower wall part extending in a vehicle width direction which is formed by a floor panel and a floor cross member joined to the floor panel, a closed-cross section portion positioned at each of said vehicle-body right-and-left both side wall parts extending in a vehicle vertical direction which is formed by the rear wheel house and a brace member joined to said rear wheel house, a rigidity member positioned at each of said vehicle-body right-and-left both side wall parts which is formed by a gusset member which connects, in the vehicle longitudinal direction, a rear pillar and said damper support section and a wheel house reinforcement arranged around the damper support section, and a closed-cross section portion positioned at said vehicle-body rear wall part extending in the vehicle width direction which is formed by a rear end panel and a rear end cross member joined to the rear end panel.

6. The rear vehicle-body structure of the vehicle of claim 1, further comprising:
    a damper support section for a front suspension provided at an upper part of a front wheel house;
    a fourth loop-shaped structure section provided in a vicinity of said damper support section for the front suspension so as to have a loop shape in the vehicle elevational view; and
    a fifth loop-shaped structure section provided around a door opening portion so as to have a loop shape in the vehicle side view,
    wherein said first loop-shaped structure section and said fifth loop-shaped structure section are connected via said pillar, and each of said fourth and fifth loop-shaped structure sections is formed by a closed-cross section portion where a closed-cross section is partitioned by plural members and/or a thick plate portion having a thicker plate thickness than the vehicle-body panel.

7. The rear vehicle-body structure of the vehicle of claim 1, wherein a front-rear width of the plate member overlaps with a front-rear width of the wheel house reinforcement in the vehicle side view.

8. The rear vehicle-body structure of the vehicle of claim 1, wherein the plate member connects the wheel house reinforcement and the rear pillar.

9. The rear vehicle-body structure of the vehicle of claim 5, wherein
    the gusset member comprises an upper wall portion, a lower wall portion which extends downwardly from an inward end, in the vehicle width direction, of the upper wall portion, a flange portion which extends upwardly from an outward end, in the vehicle width direction, of the upper wall portion, a ridgeline which extends in the vehicle longitudinal direction along a longitudinal direction of the gusset member provided between the upper wall portion and the lower wall portion, and a ridgeline which extends in the vehicle longitudinal direction along the longitudinal direction of the gusset member provided between the upper wall portion and the flange portion.

10. The rear vehicle-body structure of the vehicle of claim 5, wherein the plate member is located at the same longitudinal position as a front end of the gusset member.

\* \* \* \* \*